United States Patent [19]

Domeier

[11] Patent Number: 4,857,579
[45] Date of Patent: Aug. 15, 1989

[54] THERMOSETTABLE FIBER REINFORCED RESIN COMPOSITIONS

[75] Inventor: Linda A. Domeier, Somerville, N.J.

[73] Assignee: Union Carbide Corporation, Danbury, Conn.

[21] Appl. No.: 125,358

[22] Filed: Nov. 25, 1987

Related U.S. Application Data

[63] Continuation of Ser. No. 854,722, Apr. 16, 1986, abandoned, which is a continuation of Ser. No. 746,464, Jun. 20, 1985, abandoned, which is a continuation of Ser. No. 603,985, Apr. 26, 1984, abandoned, and a continuation of Ser. No. 487,023, Apr. 21, 1983, abandoned, and a continuation of Ser. No. 209,423, Nov. 24, 1980, abandoned.

[51] Int. Cl.$^4$ .............. C08K 7/02; C08K 7/04; C08K 7/14; G08G 18/14
[52] U.S. Cl. ............... 524/507; 524/492; 524/495; 525/125; 525/126; 525/127; 525/131
[58] Field of Search ............ 525/125, 126, 127, 131; 524/507, 492, 495

[56] References Cited

U.S. PATENT DOCUMENTS

| | | | |
|---|---|---|---|
| 3,641,199 | 2/1972 | Niederhauser et al. | 525/440 |
| 3,700,752 | 10/1972 | Hutchinson | 260/37 N |
| 3,886,229 | 5/1975 | Hutchinson et al. | 525/18 |
| 3,929,929 | 12/1975 | Kuehn | 525/440 |
| 3,968,073 | 7/1976 | Hara et al. | 260/42.15 |
| 4,049,747 | 9/1977 | Jin et al. | 525/123 |
| 4,098,733 | 7/1978 | Olstowski et al. | 521/123 |
| 4,107,845 | 8/1978 | Lee et al. | 260/42.17 |
| 4,119,681 | 10/1978 | Veselovsky et al. | 525/445 |
| 4,128,600 | 12/1978 | Skinner et al. | 525/123 |
| 4,242,415 | 12/1980 | Feltzin et al. | 525/126 |
| 4,268,646 | 5/1981 | Agger et al. | 525/127 |

FOREIGN PATENT DOCUMENTS 1557015 12/1979 United Kingdom.

OTHER PUBLICATIONS

Derwent Abst. 63232 W/38 J 75025516, 8-23-75, Kansai Paint K. K.
Derwent Abst. 40150 U/29 DT 2163660, 7-5-73, "Coating Comp. . . . ", Ford-Werke AG.
Derwent Abst. 40151 U/29 DT 2163661, 7-5-73, "Coating Comp. . . . ", Ford-Werke AG.
Chem. Abs. vol. 94 (104341), Peters, Eur Pat. 18638, Nov. 12, 1980, "Polyacrylate-cont Comp. . . . ", Union Carbide.

*Primary Examiner*—Herbert J. Lilling
*Attorney, Agent, or Firm*—Paul W. Leuzzi

[57] ABSTRACT

Described herein are curable molding compositions comprising a mixture of:

I. from about 25 to about 90 weight percent of a thermosetting resin containing:
   (a) from about 5 to about 95 weight percent of a polyester resin derived from the reaction of a poly(acrylate) and a vinyl monomer, said poly(acrylate) and vinyl monomer essentially free from functional groups reactive with the polyol or the polyisocyanate of (b);
   (b) from about 95 to about 5 weight percent of a polyurethane derived from the reaction of a saturated polyol and a polyisocyanate, said polyol and polyisocyanate free from unsaturated groups capable of copolymerizing with the poly(acrylate) or vinyl monomer of (a); and II. from about 75 to about 10 weight percent of one or more fibers with a melting point or a glass transition temperature above about 130° C.; wherein (b) constitutes less than 40 weight percent of (I) and (II).

12 Claims, No Drawings

THERMOSETTABLE FIBER REINFORCED RESIN COMPOSITIONS

This application is a continuation of prior U.S. application Ser. No. 854,722, filed 4/16/86, which is a continuation of application Ser. No. 746,464, filed 6/20/85, which is a continuation of application Ser. No. 603,985, filed 4/26/84, and a continuation of application Ser. No. 487,023, filed 4/21/83, and a continuation of application Ser. No. 209,423, filed 11/24/80, all of which are abandoned.

BACKGROUND OF THE INVENTION

This invention relates to a thermosettable fiber reinforced resin composition containing thermosetting resins based on polyurethanes and unsaturated polyesters formed from poly(acrylates).

U.S. Pat. No. 3,700,752 describes a process for the preparation of shaped polymeric articles by gelpolymerizing a homogeneous composition comprising at least one vinyl monomer and the precursors of a cross-linked polyurethane and shaping the composition at a stage when it is still fluid, in which the composition comprises from 5 to 95% by weight of cross-linked polyurethane precursors free of groups copolymerizable with vinyl monomer and from 95 to 5% by weight at least one vinyl monomer, and the gellation of the resin via formation of the polyurethane is substantially completed before polymerization of the vinyl monomer is allowed to proceed to the extent that the vinyl polymer so produced forms a separate phase, and thereafter polymerization of the vinyl monomer is completed. The vinyl monomers are described as including esters of acrylic acid. The urethanes suitable for use in U.S. 3,700,752 are such that the cross-link density of these urethanes is lower than those of the present invention.

The patent states in column 12 that the notch impact strengths of the products produced can be improved by incorporating fibrous reinforcement in the product in proportions of 10 to 50% by weight of the total weight of the fiber-reinforced product.

The instant polyurethane/polyester resin systems are especially suited to produce thermoset molded articles by rapid injection molding techniques. The polyurethane/polyester resin systems of this inventin are not gelled via formation of the polyurethane prior to molding as the resins in U.S. Pat. No. 3,700,752.

U.S. Pat. No. 4,098,733 describes that polyurethanes and vinyl polymer composites are rapidly prepared without the requirement of the application of an external source of heat by the admixture of a composition comprising (A) a liquid polyol, (B) an organic polyisocyanate, (C) a liquid ethylenically unsaturated monomer, (D) a catalyst for polymerizing componet (C), (E) a caalyst for urethane formation, (F) 0 to 50% by weight based upon the combined weights of components (A), (B), (C), (D), (E) and (F) of a modifier substance. The modifier substances are stated, in column 2 of the patent, as selected from (1) liquid substances having an atomspheric boiling point of at least about 150° C.; (2) solid substances having a surface area of less than about 0.8 m²/gram and a particle size such that it will pass through a ¼ inch square opening and will not decompose at a temperature below the maximum exotherm temperature generated by the urethane forming reaction; (3) particular polymers of one or more ethylenically unsaturated monomers and (4) mixtures thereof. Several provisos are then stated, one of which is that the combined quantity of components (C) and (F) be less than about 60% by weight based upon the combined weights of components (A), (B), (C) and (F).

The admixed composition is stated to be then poured into a suitable mold wherein the composition solidifies within about 15 minutes to a solid having a density of at least about 1 g/cc and a percent elongation of less than about 100.

Suitable components stated as component (F2), i.e., the solid substances, in the patent are described in column 11 as including sold modifiers such as the woven or mat materials wherein the individual fibers from which such materials are prepared have a surface area of less than 0.8 m²/gram and which will pass through a ¼ inch square opening.

Of the 87 Examples of this patent, only two Examples, i.e., Examples 10 and 11 describe an acrylate component. Example 10 of this patent describes blending the following components: 50 grams of Polyol A (defined in column 10 as an adduct of glycerine and propylene oxide, said adduct having an active hydrogen (OH) equivalent weight of about 87), 50 grams of Polyisocyanate A (defined in column 10 as an 80/20 mixture by weight of 2,4- and 2,6-toluenediisocyanate having an isocyanate equivalent weight of about 87), 50 grams of styrene, 50 grams of the trimethacrylate ester of trimethylol propane, 0.4 grams of tertiarybutyl perbenzoate and 1.14 grams of lead octoate. Example 11 describes blending the following components: 50 grams of Polyol A, 50 grams of polyisocyanate A, 50 grams of styrene, 24 grams of the dimethacrylate ester of 1,3-butylene glycol, 0.3 grams of tertiary butyl perbenzoate, and 1.14 grams of lead octoate.

Example 86 of this patent describes blending the following components: 50 grams of Polyol A, 50 grams of Polyisocyanate A, 50 grams of styrene, 1 gram of tertiary-butyl perbenzoate and 0.23 grams of lead octoate. The mixture is poured over 35 grams of glass fiber cloth having a surface area of <0.3 m²/grams. Only this Example of the patent describes a composition added to glass.

Therefore, according to U.S. Pat. No. 4,098,733 component (F) is optional and limited in its use since the composition can contain 0 to 50% by weight of this component. The amount of glass reinforcement which can be added is also constrained by limits on the total amount of polyester and component F in the composition. These limitations exclude those compositions which we have found to offer optimum mechanical properties. Also, this component (F) is described as selected from one of four components, i.e., (1) to (4), supra, with only one Example describing glass fiber cloth.

In the instant invention, it has been found that thermosetting resins based on polyurethane and unsaturated polyesters formed from poly(acrylates), containing fiber reinforcement produce molded articles with an excellent combination of mechanical properties. Composites prepared from the polyurethane and unsaturated polyester resins of this invention have a combination of physical properties superior to those of composites prepared from either polyester resins or polyurethane resins.

THE INVENTION

This invention is directed to a curable molding composition comprising a mixture of:

I. from about 25 to about 90 weight percent of a thermosetting resin containing:
(a) from about 5 to about 95 weight percent of a polyester resin derived from the reaction of a poly(acrylate) and a vinyl monomer, said poly(acrylate) and vinyl monomer essentially free from functional groups reactive with the polyol or the polyisocyanate of (b);
(b) from about 95 to about 5 weight percent of a polyurethane derived from the reaction of a saturated polyol and a polyisocyanate, said polyol and polyisocyanate free from unsaturated groups capable of copolymerizing with the poly(acrylate) or vinyl monomer of (a); and II. from about 75 to about 10 weight percent of one or more fibers with a melting point or a glass transition temperature above about 130° C., wherein (b) constitutes less than 40 weight percent of (I) and (II).

The thermosetting resin systems of this invention, i.e., the polyurethane and polyester may be classified as interpenetrating polymer networks (IPN) and are essentially free of covalent bonds between each other.

The instant resin system is especially suited to produce thermoset fiber-reinforced molded articles by rapid injection molding techniques.

The resin system herein has a low viscosity, so that it can be used to produce thermoset resin articles containing up to about 75 weight percent of reinforcing fibers. The molded articles are produced by a mold cycle that is generally less than about 10 minutes, preferably less than about 5 minutes from the time the cure of the resin is initiated. The fiber reinforced articles have an excellent balance of mechanical properties.

The polyester resin is derived from the reaction of a poly(acrylate) and a vinyl monomer.

The poly(acrylate) is characterized by the following empirical formula:

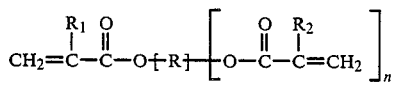

wherein R is the residue of an organic polyhydric alcohol which contained alcoholic hydroxyl groups bonded to different carbon atoms, $R_1$ and $R_2$ are independently hydrogen or methyl, n is 1 to 3.

The polyhydric alcohol suitable for preparing the poly(acrylate) is typically a polyhydric alcohol which contains at least two carbon atoms and which may contain from 2 to 4, inclusive, hydroxyl groups. These polyhydric alcohols include alkane diols, triols, tetraols, aliphatic ether containing diols, triols, tetraols, cycloaliphatic containing diols, triols, and tetraols, and aromatic containing diols, triols, and tetraols, and the like. Specific illustrations of organic polyols suitable in the practice of this invention include the following: ethylene glycol; diethylene glycol; 2,2,4-trimethyl-1,3-pentanediol; dipropylene glycol; propylene glycol; polypropylene glycol having an average molecular weight of about 150 to about 600, triethylene glycol; 1,4-cyclohexane dimethanol; neopentyl glycol; 2,2-dimethyl-3-hydroxypropyl-2,2-dimethyl-3-hydroxypropionate; polyethylene glycol having an average molecular weight of about 150 to about 600; 2,2-bis[4-(2-hydroxyethoxy)phenyl]propane; 2,2-bis[4-(2-hydroxypropoxy)phenyl]propane; triethanolamine; 1,3-butanediol; tetraethylene glycol; 2,2-bis(4-hydroxyphenyl)propane; glycerine; trimethylol propane; 1,4-butanediol, the polycaprolactone ester of trimethylol propane which contains about 1.5 moles of caprolactone ester; the polycaprolactone ester of trimethylol propane which contains about 3.6 moles of caprolactone; 2-ethyl-1,3-hexanediol, 1,5-pentanediol, tripropylene glycol, 2,2-bis-(4-hydroxycyclohexyl)propane; 1,2,6-hexane triol; 1,3-propanediol; and the like. The use of mixtures of the aformentioned polyols in this invention is also possible.

The poly(acrylate) of the aformentioned organic polyhydric alcohol can be prepared by the reaction of acrylic acid or methacrylic acid or their simple esters with the polyhydric alcohol under conditions well known in the art.

The preferred poly(acrylate) includes ethoxylated bispheol-A dimethacrylate, tetraethylene glycol dimethacrylate, and diethylene glycol dimethacrylate.

Suitable vinyl monomers which may be employed in the practice of this invention are one or more monomers which contain a single

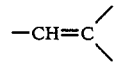

group, and preferably a

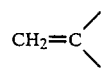

group. These monomers include styrene and its derivatives and homologues, esters of acrylic or methacrylic acid, acrylonitrile, methacrylonitrile, and the like. Also, the monomers include vinyl ethers and esters, e.g. vinyl acetate, vinyl propionate, methyl vinyl ether, and the like. Mixtures of the aforementioned monomers may be effectively employed in the practice of this invention. The preferred vinyl monomer is styrene.

The poly(acrylate) and vinyl monomer are essentially free of functional groups reactive with a polyol or a polyisocyanate. It is understood, however, that minor amounts of vinyl monomers reactive with the polyisocyanate, such as hydroxyethyl acrylate and the like may be added to the composition of this invention.

In the practice of this invention, the poly(acrylate) and vinyl monomer are combined in proportions of from about 30:70 to about 70:30.

The polyurethanes suitable for use herein are derived from the reaction of a saturated polyol and a polyisocyanate.

Suitable polyols include those having a functionality of from abot 2 to about 8 and an equivalent weight of from about 30 to 350. These polyols are prepared by reacting an initiator having from about 2 to about 8 active hydrogens (functionality) with a vicinal epoxy compound.

Suitable initiator compounds include ethylene glycol, propylene glycol, glycerine, trimethylolpropane, pentaerythritol, sorbitol, sucrose, hydroquinone, resorcinol, catechol, bisphenols, novolac rresins, ammonia, ethylenediamine, propylenediamine, 1,6-hexanediamine, diethylenetriamine, triethylenetetramine, tetraethylenepentamine, aminoethylethanolaine, phenol-formaldehyde-aniline resins, mixtures thereof and the like.

Suitable vicinal epoxy compounds include, for example, ethylene oxide, 1,2-propylene oxide, 1,2-butylene oxide, 2,3-butylene oxide, epichlorohydrin, epibromohydrin, styrene oxide, butylglycidylether, phenylglycidylether, mixtures thereof and the like.

Polyisocyanates employed in the present invention are aromatic, aliphatic and cycloaliphatic polyisocyanates having 2 or more isocyanate groups per molecule and having an isocyanate equivalent weight of less than 300. Preferably the polyisocyanates are essentially free from ethylenic unsaturation and have no other substituents capable of reacting with the polyol.

Suitable organic polyisocyanates include the hydrocarbon diisocyanates (e.g., the alkylene diisocyanates and the arylene diisocyanates) as well as known triiosocyanates. As examples of suitable polyisocyanates one can mention 1,2-diisocyanatoethane, 1,3-diisocyanatopropane, 1,2-diisocyanatopropane, 1,4-diisocyanatobutane, 1,5-diisocyanatopentane, 1,6-diisocyanatohexane, bis(3-isocyanatopropyl) ether, bis(3-isocyanatopropyl)-sulfide, 1,7-diisocyanatoheptane, 1,5-diisocyanato-2, -2-dimethylpentane, 1,6-diisocyanato-3-methoxyhexane, 1,8-diisocyanatooctane, 1,5-diisocyanato-2,2,4-trimethylpentane, 1,9-diisocyanatononane, 1,10-diisocyanatopropyl ether of 1,4-butylene glycol, 1,11-diisocyanatoundecane, 1,12-diisocyanatododecane, bis(isocyanatohexyl) sulfide, 1,4-diisocyanatobenzene, 2,4-diisocyanatotoluene, 2,6-diisocyanatotoluene and mixtures thereof, 1,3-diisocyanato-o-xylene, 1,3-diisocyanato-m-xylene, 1,3-diisocyanato-p-xylene, 2,4-diisocyanato-1-chlorobenzene, 2,4-diisocyanato-1-chlorobenzene, 2,4-diisocyanato-1-nitrobenzene, and 2,5-diisocyanato-1-nitrobenzene, 4,4'-diphenylmethylene diisocyanate, 3,3'-diphenylmethylene diisocyanate, 2,4'-diphenylmethylene diisocyanate, modified diphenylmethylene diisocyanates modified with carbodiimides to liquefy same, and polymethylene poly(phenyleneisocyanates) having the formula:

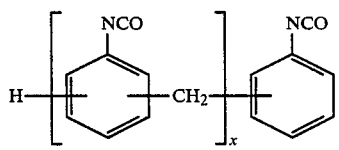

wherein x has an average value from 1.1 to 5 inclusive (preferably from 2.0 to 3.0), and mixtures thereof.

The polyol and polyisocyanate are free from unsaturated groups capable of copolymerizing with a poly(acrylate) or vinyl monomer.

In the practice of this invention, the polyol and polyisocyanate are combined such that the molar ratio of isocyanate to hydroxyl groups is in the range of from about 1.2:1 to 0.8:1.

In the present invention two types of catalysts may be used, i.e., a catalyst for formation of the polyurethane, and a catalyst to initate the co-reaction of the poly(acrylate) and vinyl monomer.

Suitable catalysts for polyurethane formation include:
(a) tertiary amines such as bis(dimethylaminoethyl)-ether, trimethylamine, triethylamine, N-methylmorpholine, N-ethylmorpholine, N,N-dimethylbenzylamine, N,N-dimethylethanolamine, N,N,N'N'-tetramethyl-1,3-butane-diamine, triethanolamine, 1,4-diazabicyclo[2.2.2.]octane, pyridine, and the like; (b) tertiary phosphines such as trialkylphosphines, dialkylbenzylphosphines, and the like; (c) strong bases such as alkali and alkaline earth metal hydroxides, alkoxides, and phenoxides; (d) acidic metal salts of strong acids such as ferric chloride, stannic chloride, stannous chloride, antimony trichloride, bismuth nitrate and chloride, and the like; (e) chelates of various metals such as those which can be obtained from acetylacetone, benzoylacetone, trifluoroacetylacetone, ethyl acetoacetate, salicylaldehyde, cyclopentanone-2-carboxylate, acetylacetoneimine, bis-acetylacetonealkylenediimines, salicyclaldehydiimine, and the like, with the various metals such as Be, Mg, Zn, Cd, Pb, Ti, Zr, Sn, As, Bi, Cr, Mo, Mn, Fe, Co, Ni, or such ions as $MoO_2^{++}$, $UO_2^{++}$, and the like; (f) alcoholates and phenolates of various metals such as $Ti(OR)_4$, $Sn(OR)_2$, $Al(OR)_3$, and the like, wherein R is alkyl or aryl, and the reaction products of alcoholates with carboxylic acids, betadiketones and 2-(N,N-dialkylamino) alkanols, such as the well known chelates of titanium obtained by said or equivalent procedures; (g) salts of organic acids with a variety of metals such as alkali metals, alkaline earth metals, Al, Sn, Pb, Mn, Co, Ni, and Cu, including for example, sodium acetate, potassium laurate, calcium hexanoate, stannous acetate, stannous octoate, stannous oleate, lead octoate, metallic driers such as manganese and cobalt naphthenate, and the like; (h) organometallic derivatives of tetravalenttin, trivalent and pentavalent As, Sb, and Bi and metal carbonyls of iron and cobalt.

The organotin compounds deserve particular mention as catalysts for catalyzing the polyurethane-forming reactions. These compounds include the dialkyltin salts of carboxylic acids, e.g., dibutyltin diacetate, dibutyltin dilaurate, dibutyltin maleate, dilauryltin diacetate, dioctyltin diacetate, dibutyltin-bis(6-methylaminocaproate), and the like. Similarly, there may be used a trialkyltin hydroxide, dialkyltin oxide, dialkyltin dialkoxide, o dialkyltin dichloride. Examples of these compounds include trimethyltin hydroxide, dibutyltin oxide, doctyltin oxide, dilauryltin oxide, dibutyltin-bis(isopropoxide), dibutyltin-bis(2-dimethylaminopentate), dibutyltin dichloride, dioctyltin dichloride, and the like.

The tertiary amines may be used as primary catalysts for accelerating the reactive hydrogen/isocyanate reaction or as secondary catalysts in combination with one or more of the above-noted metal catalysts, e.g., the organotin catalysts. Metal catalysts, or combinations of metal catalysts, may also be employed as the accelerating agents, without the use of amines. The catalysts for catalyzing the polyurethane-forming reaction are employed in small amounts, for example, from about 0.001 percent to about 1 percent, based on the combined weight of the polyisocyanate and the polyester.

The polyurethane forming catalyst is optional herein since the polyol and polyisocyanate may be efficiently reacted in a heated mold even in the absence of such catalysts.

The free-radical curing catalysts which initiate curing and initiate the co-reaction of the poly(acrylate) and vinyl monomer include azo and peroxide curing agents. Azo and peroxide curing agents are described by, for example, Gallagher, et al. "Organic Peroxides Review, Plastics Design & Processing, July, 1978, pages 38–42, and August, 1978, pages 60–67, inclusive. The technology disclosed in those two articles is incorporated herein by reference. The choice of the specific peroxide or azo initiators for the purpose of curing the composition of this invention is within the purview of those having skill in this art and the manner in which such peroxides and azo initiators effect a desirable cure is generally characterized in the aforementioned articles.

Illustrative of a few such curing agents are 2,2'-azobis-isobutyronitrile, dibenzoyl peroxide, lauroyl peroxide, di-t-butyl peroxide, diisodpropyl peroxide carbonate, t-butyl peroxy-2-ethylhexanoate, t-butylperpivalate, 2,5-dimethylhexane-2,5-di-per-2-ethylhexanoate, t-butylperoctoate, t-butylperneodecanoate, t-butylperbenzoate, t-butylpercrotonate, t-butyl perisobutyrate, di-t-butyl perphthalate, 1,1-bis(t-butylperoxy)-3,3,5-trimethylcyclohexane, and the like.

The concentration of the curing agent can be varied within wide limits. As a representative range, the concentration can vary from about 0.25 to about 5.0 weight percent, preferably from about 0.5 to about 2.5 weight percent, and most preferably, from about 0.75 to about 2.0 weight percent, based on the weight of the poly(acrylate) and vinyl monomer.

The thermosetting resin system of this invention contains from about 5 to about 95, preferably from about 25 to about 75, most preferably about 50 weight percent of the polyester and from about 95 to about 5, preferably from about 75 to about 25, and most preferably about 50 weight percent of the polyurethane.

The fibers, which are suitable for use in this invention as reinforcing agents, have a melting point or a glass transition temperature above about 130° C. These fibers include fiberglass, carbon fibers, aromatic polyamide fibers (such as armid fibers sold by E. I. duPont de Nemors & Company, Wilmington, Del., under the trademark of Kevlar), metal fibers, such as aluminium and steel fibers, boron fibers, and the like.

The carbon fibers include those having a high Young's modulus of elasticity and high tensile strength. These carbon fibers may be produced from pitch, as described in U.S. Pat. Nos. 3,976,729; 4,005,183 and 4,026,788, for example.

The preferred fibers are fiberglass, carbon fibers, aromatic polyamide fibers, and mixtures thereof.

The fibers which are suitable for use in this invention, preferably, have a length of at least ¼ inch, and an average length of at least ½ inch. Fibers with different lengths exceeding ¼ inch may be used, provided that at least about 50 percent of the fibers have lengths greater than ½ inch. Preferred fiber lengths are from 1 to 2 or more inches. Continuous filaments may also be used.

It is also within the scope of this invention to include the use of fiber reinforcements of shorter lengths and also fillers such as milled glass.

The molded article contains from about 10 to about 75, preferably from about 50 to about 65 weight percent of the reinforcement fiber or from about 20 to about 40 weight percent of milled glass reinforcement.

It is, furthermore, desirable to utilize a vinyl polymerization inhibitor in those cases where the poly(acrylate) and/or polymerizable vinyl monomers are to be stored, shipped, or sold. Suitable vinyl polymerization inhibitors are hydroquinone, quinone, para-benzoquinone, t-butyl catechol, quinhydrone, toluhydroquinone, mono-t-butylhydroquinone, 2,5-di-t-butylhydroquinone, hydroquinone monomethyl ether, the diphenol drivatives described in U.S. Pat. No. 4,158,027, and the like. The amount of inhibitor for the purpose of preventin vinyl polymerization can be that conventionally used, namely from about 100 to about 300 ppm of the combined weight of the poly(acrylate) and vinyl monomer.

The composition of this invention may also include other ingredients, such as mold release agent, and the like.

The thermosetting resin systems of this invention are suitably molded by the RIM (reaction injection molding) process. In this process, two packages are prepared for subsequent rapid mixing and molding by machine. One package comprises a mixture of the polyol, optionally, the vinyl monomer and/or poly(acrylate), the polyurethane reaction catalyst and, optionally, a vinyl polymerization inhibitor. The other package comprises a mixture of the polyisocyanate, optionally, ethylenically unsaturated monomer and/or poly(acrylate), the free radical curing agent and, optionally, a vinyl polymerization inhibitor. It is understood that the ethylenically unsaturated monomer and/or poly(acrylate) may be distributed between the two packages so as to adjust their volumes and/or viscosities to desirable levels. Both packages, when properly formulated, are relatively stable such that they can be stored, shipped and/or sold. At the time of use the packages are rapidly and continuously mixed and molded into the desired shapes.

A preferred procedure for producing a molded article from the compositions of this invention is described in U.S. patent application Ser. No. 135,906 entitled "Molding Process and Apparatus Therefore", and filed on Apr. 14, 1980 in the same name of R. Angell, Jr., which is incorporated herein by reference. In this application, a process for rapidly fabricating fiber reinforced thermoset resin articles is described. The fiber reinforcement is comprised of one or more fibers with a melting point or a transition temperature above about 130° C. The process comprises the steps of (a) providing one or more fibers with a melting point or a glass transition temperature above about 130° C. in the form of an interlocked mass in a heatable matched metal die mold, (b) providing in one or more accumulator zones, a liquid body of a thermosettable organic material having a viscosity determined at 120° C., in the absence of curing agent therefore, of less than about 50 centipoise, and which is curable upon heating to a thermoset resin composition, the viscosity of said liquid body being maintained essentially constant in the accumulator zone by keeping its temperature below that at which curing of said material is substantial, (c) closing the mold containing the web, (d) injecting at least a portion of said thermosettable organic material under pressure from said accumulator zone(s) into the mold to thereby fill the cavity in said mold, (e) initiating the curing of said material in said mold by subjecting the material to a temperature above the temperature at which the curing of said material is initiated, by heating the mold, and (f) opening said mold and removing the cured thermoset article therefrom.

In said U.S. patent application Ser. No. 135,906 the apparatus comprises: (a) a heatable matched die mold containing one or more cavities therein with means for opening said mold to expose such cavities, and closing the same, and means for controlling the injection of a thermosettable organic liquid to such cavities when the mold is closed, (b) means associated with said mold, whereby one or more fibers in the form of an interlocked mass are provided in a portion of the cavities thereof when the mold is open to expose such cavities and prior to the injection of the thermosettable organic liquid to such cavities when the mold is closed, (c) accumulator means associated with said mold which can contain a thermosettable liquid transportable to means for controlling injection of said liquid to such cavities, (d) cooling means associated with the means for controlling the injection of such liquid to such cavities, whereby the temperature of the liquid in such injection means is maintained substantially below the temperature of the mold.

In the instant process, it is desirable to effect rapid mixing of the two reactive streams just prior to their entry into the mold. This can be accomplished by inserting an impingement mixing head or a static mixer in the nozzle and using two accumulator zones. In this configuration the polyol and the polyisocyanate component can be kept separate until parts are fabricated. The vinyl monomer and poly(acrylate) may be stored in either or both accumulator zones.

The thermosetting polyester/polyurethane resin composition is injected into a mold, the temperature of which varies from room temperature to 200° C. The choice of mold temperature is influenced by the free radical initiator. Typically, the mold temperature is between 100° and 170° C.

Due to the low viscosities of the compositions of this invention, they readily flow through and about and within the total confines of the mold and the fibrous material contained therein to effect a uniform distribution of the reaction product within the ultimate molded product.

In another embodiment of this invention, the reinforcement or filler, in particular, milled glass or short fiber reinforcements, may be included as part of the resin packages and injected in the mold along with the resin. Such reinforcements or fillers may be added to the package containing the polyol or, in some cases, the package containing the polyisocyanate, or both.

The following Examples serve to give specific illustration of the practice of this invention but they are not intended in any way to act to limit the scope of this invention.

The following designations used in the Examples have the following meaning:

Polyol I:

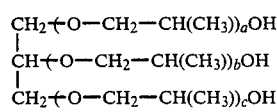

wherein a + b + c = 2.9 having a molecular weight of about 260 and a viscosity of 880 centipoise at 25° C.

Polyol II:

A polyol prepared from the reaction of (a) 27 parts by weight of N(CH$_2$CH$_2$OH)$_3$ and 21 parts by weight of

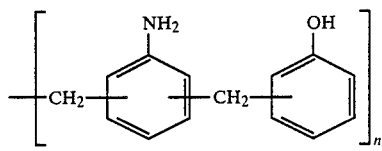

having a molecular weight of about 410, with
(b) 37 parts by weight of

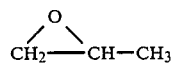

and 16 parts by weight of:

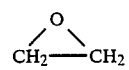

to give a polyol with a functionality of 3.6 and a viscosity of 5000 centipoise at 25° C.

Polyol III.

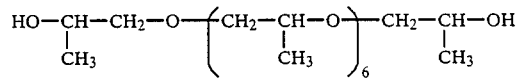

having a molecular weight of about 425 and a viscosity of 80 centipoise at 25° C.

To all of the polyols in the Examples, 0.05 weight percent of dibutyl tin dilaurate catalyst has been added.

Isocyanate I:

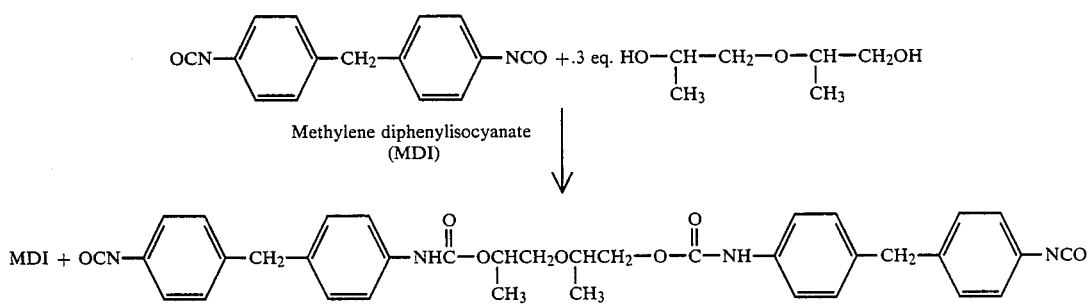

Methylene diphenylisocyanate (MDI)

have a functionality of 2.0:

Isocyanate II:

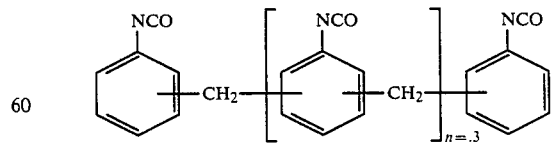

The procedures used to test these composites were as follows:

| Physical Property | ASTM Test Method |
|---|---|
| Heat distortion temperature (°C.) | D-648 |

| Physical Property | ASTM Test Method |
|---|---|
| Notched Izod Impact, (ft-lb/in) | D-256 |
| Tensile strength (psi) Tensile modulus (psi) Elongation at break (%) | D-638 |
| Flexural modulus at −29° C. (psi) Flexural modulus at 25° C. (psi) Flexural modulus at 70° C. (psi) Flexural strength at −29° C. (psi) Flexural strength at 25° C. (psi) Flexural strength at 70° C. (psi) | D-790 |

EXAMPLES 1 TO 3

In the following Examples the effect of glass content on the properties of glass-reinforced compositions of polyurethane/polyester resin systems is shown.

Example 1

A resin mixture was prepared by mixing the following ingredient at about 25° C.:

47 g of ethoxylated bisphenol-A dimethacrylate,
43 g of styrene,
38 g of Polyol I,
52 g of Isocyanate II, and
2.3 g of t-butyl perbenzoate.

Six to eight plies (180 grams) of PPG type AKM glass mat (sold by PPG Industries, Pittsburgh, Pa.) with dimensions of 10×10 inches were placed in a pressure bag mold. The pressure bag mold is situated between a heated top and bottom platen. The female mold cavity on top of the bottom platen had inner dimensions of 10×10 inches and contained a nitrogen inlet. Between the female mold cavity and top platne were the following: a layer of aluminum foil partially depressed to fit into the mold; a 10×10 inch chrome plate, a second layer of aluminum foil partially depressed to fit into the mold, a third layer of aluminum foil, a 12×12 inch chrome plate, and a rubber pad. The bottom aluminum foil, the 10×10 inch chrome plate and second layer of aluminum foil were placed in the mold cavity together with a ⅛×10×10 inch aluminum plate to simulate the finished plaque. The mold was closed to preform or depress the aluminum foils. The press was opened and the aluminum plate removed. The second and third sheets of aluminum foil were coated with a thin film of mold release agent. The preformed space was filled with the glass mat. The resin mixture was poured over the glass mat as evenly as possible. The top or third aluminum foil, 12×12 inch chrome plate, and rubber pad were put in place and the press was closed and pressured to about 40 tons. The mold cavity was pressured with nitrogen to the desired pressure of about 150 to about 250 psi. The mold temperature was 130° C. The resin was cured in about 10 minutes. The pressure was released, the press opened and the plaque removed.

The plaque was tested to determine Heat Distortion Temperature, Notched Izod Impact, Tensile Strength, Tensile Modulus, Elongation at Break, Flexural Strength and Flexural Modulus. The weight percent of glass in the plaque was obtained by ashing the flexural test bars.

The results are shown in Table I.

Examples 2 and 3

The resin mixture proportions of Example 1 were used to mold and test a plaque according to the procedure described in Example 1. The amount of glass added to the mold in each of these Examples was varied as shown in Table I. The total weight of resin and glass was held constant at 360 g.

The results are shown in Table I.

TABLE I

| Example | Weight % of Glass | Heat Distortion Temperature (°C.) | Notched Izod Impact (ft-lb/in²) | Tensile Strength (psi) | Tensile Modulus (psi) × 10⁶ | Elongation at Break (%) | Flexural Strength (psi) | Flexural Modulus (psi) × 10⁶ |
|---|---|---|---|---|---|---|---|---|
| 1 | 51.2 | >260 | 17.6 | 32,400 | 1.80 | 2.1 | 53,600 | 1.98 |
| 2 | 61.8 | >260 | 25.7 | 35,400 | 2.09 | 2.0 | 61,600 | 2.20 |
| 3 | 70.1 | >260 | 24.1 | 40,500 | 2.64 | 1.9 | 64,500 | 2.84 |

Control A

A resin mixture was prepared by mixing 94 g of ethoxylated bisphenol-A dimethacrylate and 86 g of styrene at about 25° C.

The resin mixture was poured into 180 g of glass fiber in the pressure bag mold and molded into a plaque as described in Example 1. The plaque was then tested to determine the following properties: heat distortion temperature, notched izod impact, tensile strength, tensile modulus, elongation at break, flexural modullu at −29° C., flexural modulus at 25° C., flexural modulus at 70° C., flexural strength at −29° C., flexural strength at 25° C. and flexural strength at 70° C.

The results are shown in Table II.

Control B

A resin mixture was prepared by mixing 62 g of Polyol I and 118 g of Isocyanate I at about 25° C.

The resin mixture was poured into 180 g of glass fiber in the pressure bag mold and molded into a plaque as described in Example 1. The plaque was then tested as described in Control A.

The results are shown in Table II.

Example 4

A resin mixture was prepared by mixing the following ingredients at about 25° C.:

70 g of ethoxylated bisphenol-A dimethacrylate,
65 g of styrene,
29 g of Isocyanate I,
16 g of Polyol I, and
3.4 g of t-butyl perbenzoate.

The resin mixture was poured into 180 g of glass fiber in the pressure bag mold and molded into a plaque as described in Example 1. The plaque was then tested as described in Control A.

The results ae shown in Table II.

Example 5

A resin mixture was prepared by mixing the following ingredients at about 25° C.:

47 g of ethoxylated bisphenol-A dimethacrylate,
43 g of styrene,
59 g of Isocyanate I,
31 g of Polyol I, and 2.3 g of t-butyl perbenzoate.

The resin mixture was poured into 180 g of glass fiber in the pressure bag mold and molded into a plaque as described in Example 1. The plaque was then tested as described in Control A.

The results are shown in Table II.

Example 6

A resin mixture was prepared by mixing the following ingredients at about 25° C.
 23 g of ethoxylated bisphenol-A dimethacrylate,
 22 g of styrene,
 88 g of Isocyanate I,
 47 g of Polyol I, and
 1.1 g of t-butyl perbenzoate.

The resin mixture was poured into 180 g of glass fiber in the pressure bag mold and molded into a plaque as described in Example 1. The plaque was then tested as described in Control A.

The results are shown in Table II.

Table II also shows the weight ratio of polyester to polyurethane resin in the sample.

17 g of Isocyanate II,
28 g of Polyol III, and
3.4 g of t-butyl perbenzoate.

The resin mixture was poured into 180 g of glass fiber in the pressure bag mold and molded into a plaque as described in Example 1. The plaque was then tested as described in Control A.

The results are shown in Table III.

Example 8

A resin mixture was prepared by mixing the following ingredients at about 25° C.:
 47 g of ethoxylated bisphenol-A dimethacrylate,
 43 g of styrene,
 33 g of Isocyanate II,
 57 g of Polyol III, and
 2.3 g of t-butyl perbenzoate.

The resin mixture was poured into 180 g of glass fiber in the pressure bag moldand molded into a plaque as described in Example 1. The plaque was then tested as described in Control A.

The results are shown in Table III.

TABLE II

| Example | Control A | 4 | 5 | 6 | Control B |
|---|---|---|---|---|---|
| Wt. ratio of Polyester to Polyurethane | 100/0 | 75/25 | 50/50 | 25/75 | 0/100 |
| Wt. % of glass | 53.3 | 51.7 | 47.8 | 50.0 | 46.3 |
| Heat Distortion Temp. (°C.) | >260 | >260 | >260 | 231 | 198 |
| Notched Izod Impact (ft-lb/in$^2$) | 17.6 | 15.5 | 14.8 | 17.2 | 12.2 |
| Tensile strength (psi) | 22,400 | 26,600 | 28,000 | 31,600 | 27,700 |
| Tensil modulus (psi) × 10$^6$ | 1.22 | 1.42 | 1.40 | 1.57 | 1.57 |
| Elongation at break (%) | 2.0 | 2.2 | 2.4 | 2.5 | 2.1 |
| Flexural modulus at −29° C. (psi) × 10$^6$ | 1.28 | 1.56 | 1.49 | 1.81 | 1.44 |
| Flexural modulus at 25° C. (psi) × 10$^6$ | 1.39 | 1.72 | 1.65 | 1.83 | 1.29 |
| Flexural modulus at 70° C. (psi) × 10$^6$ | 1.12 | 1.14 | 1.42 | 1.19 | 1.32 |
| Flexural strength at −29° C. (psi) | 33,100 | 45,900 | 49,500 | 56,100 | 55,200 |
| Flexural strength at 25° C. (psi) | 31,400 | 44,300 | 46,200 | 49,200 | 43,800 |
| Flexural strength at 70° C. (psi) | 25,500 | 34,900 | 40,600 | 36,400 | 35,400 |

Control C

A resin mixture was prepared by mixing 114 g of Polyol III and 66 g of Isocyanate II at about 25° C.

The resin mixture was poured into 180 g of glass fiber in the pressure bag mold and molded into a plaque as described in Example 1. The plaque was then tested as described in Control A.

The results are shown in Table III.

Example 7

A resin mixture was prepared by mixing the following ingredients at about 25° C.
 70 g of ethoxylated bisphenol-A dimethacrylate,
 65 g of styrene, Example 9

A resin mixture was prepared by mixing the following ingredients at about 25° C.
 23 g of ethoxylated bisphenol-A dimethacrylate,
 22 g of styrene,
 50 g of Isocyanate II,
 86 g of Polyol III, and
 1.1 g of t-butyl perbenzoate.

The resin mixture was poured into 180 g of glass fiber in the pressure bag mold and molded into a plaque as described in Example 1. The plaque was then tested as described in Control A.

The results ae shown in Table III.

TABLE III

| Example | Control A | 7 | 8 | 9 | Control C |
|---|---|---|---|---|---|
| Wt. ratio of Polyester to Polyurethane | 100/0 | 75/25 | 50/50 | 25/75 | 0/100 |
| Wt. % of glass | 53.3 | 48.9 | 55.4 | 50.0 | 50.4 |
| Heat Distortion Temp. (°C.) | >260 | >260 | >260 | 199 | 40 |

TABLE III-continued

| Example | Control A | 7 | 8 | 9 | Control C |
|---|---|---|---|---|---|
| Notched Izod Impact (ft-lb/in$^2$) | 17.6 | 22.3 | 19.1 | 22.5 | 24.4 |
| Tensile strength (psi) | 22,400 | 22,100 | 15,300 | 14,100 | 10,700 |
| Tensile modulus (psi) × 10$^6$ | 1.22 | 1.12 | 0.89 | 0.81 | 0.62 |
| Elongation at break (%) | 2.0 | 2.3 | 2.1 | 2.8 | 3.0 |
| Flexural modulus at −29° C. (psi) × 10$^6$ | 1.28 | 1.39 | 1.49 | 1.37 | 1.32 |
| Flexural modulus at 25° C. (psi) × 10$^6$ | 1.39 | 1.61 | 1.24 | 0.43 | 0.07 |
| Flexural modulus at 70° C. (psi) × 10$^6$ | 1.12 | 0.81 | 0.65 | 0.13 | 0.03 |
| Flexural strength at −29° C. (psi) | 33,100 | 43,200 | 44,000 | 42,800 | 50,000 |
| Flexural strength at 25° C. (psi) | 31,400 | 39,800 | 22,800 | 8,010 | 2,710 |
| Flexural strength at 70° C. (psi) | 25,500 | 13,800 | 9,790 | 3,240 | 1,140 |

Control D

A resin mixture was prepared by mixing 76 g of Polyol I and 104 g of Isocyanate II at about 25° C.

The resin mixture was poured into 180 g of glass fiber in the pressure bag mold and molded into a plaque as described in Example 1. The plaque was then tested as described in Control A.

The results are shown in Table IV.

Example 10

A resin mixture was prepared by mixing the following ingredients at about 25° C.
70 g of ethoxylated bisphenol-A dimethacrylate,
65 g of styrene,
26 g of Isocyanate II,
19 g of Polyol I, and
3.4 g of t-butyl perbenzoate.

The resin mixture was poured into 180 g of glass fiber in the pressure bag mold and molded into a plaque as described in Example 1. The plaque was then tested as described in Control A.

The results are shown in Table IV.

Example 11

A resin mixture was prepared by mixing the following ingredients at about 25° C.
47 g of ethoxylated bisphenol-A dimethacrylate,
43 g of styrene,
38 g of Isocyanate II,
52 g of Polyol I, and
2.3 g of t-butyl perbenzoate.

The resin mixture was poured into 180 g of glass fiber in the pressure bag mold and molded into a plaque as described in Example 1. The plaque was then tested as described in Control A. Note this formulation is the same as Example 1.

The results are shown in Table IV.

Example 12

A resin mixture was prepared by mixing the following ingredients at about 25° C.:
23 g of ethoxylated bisphenol-A dimethacrylate,
22 g of styrene,
78 g of Isocyanate II,
57 g of Polyol I, and
1.1 g of t-butyl perbenzoate.

The resin mixture was poured into 180 g of glass fiber in the pressure bag mold and molded into a plaque as described in Example 1. The plaque was then tested as described in Control A.

The results are shown in Table IV.

TABLE IV

| Example | Control A | 10 | 11 | 12 | Control D |
|---|---|---|---|---|---|
| Wt. ratio of Polyester to Polyurethane | 100/0 | 75/25 | 50/50 | 25/75 | 0/100 |
| Wt. % of glass | 53.3 | 56.5 | 51.2 | 43.7 | 47.5 |
| Heat Distortion Temp. (°C.) | >260 | >260 | >260 | 253 | 227 |
| Notched Izod Impact (ft-lb/in$^2$) | 17.6 | 13.2 | 17.6 | 16.1 | 20.4 |
| Tensile strength (psi) | 22,400 | 25,000 | 32,400 | 31,700 | 23,700 |
| Tensile modulus (psi) × 10$^6$ | 1.22 | 1.51 | 1.80 | 1.51 | 1.43 |
| Elongation at break (%) | 2.0 | 2.0 | 2.1 | 2.5 | 1.9 |
| Flexural modulus at −29° C. (psi) × 10$^6$ | 1.28 | 1.90 | 1.59 | 1.51 | 1.34 |
| Flexural modulus at 25° C. (psi) × 10$^6$ | 1.39 | 1.94 | 1.98 | 1.41 | 1.19 |
| Flexural modulus at 70° C. (psi) × 10$^6$ | 1.12 | 1.18 | 1.44 | 0.95 | 0.96 |
| Flexural strength at −29° C. (psi) | 33,100 | 42,100 | 50,300 | 43,700 | 44,900 |
| Flexural strength at 25° C. (psi) | 31,400 | 46,900 | 53,600 | 40,500 | 32,700 |
| Flexural strength at 70° C. (psi) | 25,500 | 35,000 | 39,600 | 31,300 | 17,700 |

Control E

A resin mixture was prepared by mixing 79 g of tetraethylene glycol dimethacrylate and 101 g of styrene at about 25° C.

The resin mixture was poured into 180 g of glass fiber in the pressure bag mold and molded into a plaque as described in Example 1. The plaque was then tested as described in Control A.

The results are shown in Table V.

Example 13

A resin mixture was prepared by mixing the following ingredients at about 25° C.:
- 59 g of tetraethylene glycol dimethacrylate,
- 76 g of styrene,
- 29 g of Isocyanate I,
- 16 g of Polyol I, and
- 3.4 g of t-butyl perbenzoate.

The resin mixture was poured into 180 g of glass fiber in the pressure bag mold and molded into a plaque as described in Example 1. The plaque was then tested as described in Control A.

The results are show in Table V.

Example 14

A resin mixture was prepared by mixing the following ingredients at about 25° C.:
- 40 g of tetraethylene glycol dimethacrylate,
- 50 g of styrene,
- 59 g of Isocyanate I,
- 31 g of Polyol I, and
- 2.3 g of t-butyl perbenzoate.

The resin mixture was poured into 180 g of glass fiber in the pressure bag mold and molded into a plaque as described in Example 1. The plaque was then tested as described in Control A.

The results are shown in Table V.

TABLE VI

| Example | Control E | 13 | 14 | Control B |
|---|---|---|---|---|
| Wt. ratio of Polyester to Polyurethane | 100/0 | 75/25 | 50/50 | 0/100 |
| Wt. % of glass | 52.3 | 52.1 | 46.7 | 46.3 |
| Heat Distortion Temp. (°C.) | >260 | >260 | >260 | 198 |
| Notched Izod Impact (ft-lb/in$^2$) | 19.2 | 17.9 | 19.9 | 12.2 |
| Tensile strength (psi) | 20,700 | 30,200 | 24,200 | 27,700 |
| Tensile modulus (psi) × 10$^6$ | 1.15 | 1.57 | 1.29 | 1.57 |
| Elongation at break (%) | 2.1 | 2.3 | 2.2 | 2.1 |
| Flexural modulus at −29° C. (psi) × 10$^6$ | 0.99 | 1.71 | 1.41 | 1.44 |
| Flexural modulus at 25° C. (psi) × 10$^6$ | 1.19 | 1.63 | 1.49 | 1.29 |
| Flexural modulus at 70° C. (psi) × 10$^6$ | 0.28 | 0.96 | 0.59 | 1.32 |
| Flexural strength at −29° C. (psi) | 31,200 | 52,600 | 44,000 | 55,200 |
| Flexural strength at 25° C. (psi) | 29,900 | 45,400 | 39,200 | 43,800 |
| Flexural strength at 70° C. (psi) | 8,600 | 20,700 | 13,600 | 35,400 |

Example 15

A resin mixture was prepared by mixing the following ingredients at about 25° C.:
- 59 g of tetraethylene glycol dimethacrylate,
- 76 g of styrene,
- 26 g of Isocyanate II,
- 19 g of Polyol I, and
- 3.4 g of t-butyl perbenzoate.

The resin mixture was poured into 180 g of glass fiber in the pressure bag mold and molded into a plaque as described in Example 1. The plaque was then tested as described in Control A.

The results are shown in Table VI.

Example 16

A resin mixture was prepared by mixing the following ingredients at about 25° C.:
- 40 g of tetraethylene glycol dimethacrylate,
- 50 g of styrene,
- 52 g of Isocyanate II,
- 38 g of Polyol I, and
- 2.3 g of t-butyl perbenzoate.

The resin mixture was poured into 180 g of glass fiber in the pressure bag mold and molded into a plaque as described in Example 1. The plaque was then tested as described in Control A.

The results are shown in Table VI.

TABLE VI

| Example | Control E | 15 | 16 | Control D |
|---|---|---|---|---|
| Wt. ratio of Polyester to Polyurethane | 100/0 | 75/25 | 50/50 | 0/100 |
| Wt. % of glass | 52.3 | 47.9 | 50.4 | 47.5 |
| Heat Distortion Temp. (°C.) | >260 | >260 | >260 | 227 |
| Notched Izod Impact (ft-lb/in$^2$) | 19.2 | 17.2 | 16.4 | 20.4 |
| Tensile strength (psi) | 20,700 | 22,700 | 27,600 | 23,700 |
| Tensile modulus (psi) × 10$^6$ | 1.15 | 1.33 | 1.47 | 1.43 |
| Elongation at break (%) | 2.1 | 2.0 | 2.2 | 1.9 |
| Flexural modulus at −29° C. (psi) × 10$^6$ | 0.99 | 1.29 | 1.52 | 1.34 |
| Flexural modulus at 25° C. (psi) × 10$^6$ | 1.19 | 1.44 | 1.63 | 1.19 |
| Flexural modulus at 70° C. (psi) × 10$^6$ | 0.28 | 0.38 | 0.49 | 0.96 |
| Flexural strength at −29° C. (psi) | 31,200 | 42,200 | 51,00 | 44,900 |
| Flexural strength at 25° C. (psi) | 29,900 | 34,600 | 47,300 | 32,700 |
| Flexural strength at 70° C. (psi) | 8,600 | 11,300 | 12,900 | 17,700 |

Control F

A resin mixture was prepared by mixing 67 g of diethylene glycol dimethacrylate and 113 g of styrene at about 25° C.

The resin mixture was poured into 180 g of glass fiber in the pressure bag mold and molded into a plaque as described in Example 1. The plaque was then tested as described in Control A.

The results ae shown in Table VII.

Example 17

A resin mixture was prepared by mixing the following ingredients at about 25° C.
- 50 g of diethylene glycol dimethacrylate,
- 85 g of styrene,
- 29 g of Isocyanate I,
- 16 g of Polyol I, and
- 3.4 g of t-butyl perbenzoate.

The resin mixture was poured into 180 g of glass fiber in the pressure bag mold and molded into a plaque as described in Example 1. The plaque was then tested as described in Control A.

The results are shown in Table VII.

Example 18

A resin mixture was prepared by mixing the following ingredients at about 25° C.:
- 33 g of diethylene glycol dimethacrylate,
- 57 g of styrene,
- 59 g of Isocyanate I,
- 31 g of Polyol I, and
- 2.3 g of t-butyl perbenzoate.

TABLE VII

| Example | Control F | 17 | 18 | Control B |
|---|---|---|---|---|
| Wt. ratio of Polyester to Polyurethane | 100/0 | 75/25 | 50/50 | 0/100 |
| Wt. % of glass | 44.6 | 50.8 | 47.5 | 46.3 |
| Heat Distortion Temp. (°C.) | >260 | >260 | >260 | 198 |
| Notched Izod Impact (ft-lb/in$^2$) | 23.8 | 20.2 | 14.9 | 12.2 |
| Tensile strength (psi) | 21,300 | 27,200 | 29,100 | 27,700 |
| Tensile modulus (psi) × 10$^6$ | 1.16 | 1.49 | 1.55 | 1.57 |
| Elongation at break (%) | 2.2 | 2.3 | 2.2 | 2.1 |
| Flexural modulus at −29° C. (psi) × 10$^6$ | 1.29 | 1.54 | 1.47 | 1.44 |
| Flexural modulus at 25° C. (psi) × 10$^6$ | 1.15 | 1.67 | 1.64 | 1.29 |
| Flexural modulus at 70° C. (psi) × 10$^6$ | 0.94 | 1.15 | 0.93 | 1.32 |
| Flexural strength at −29° C. (psi) | 32,100 | 49,400 | 47,600 | 55,200 |
| Flexural strength at 25° C. (psi) | 28,700 | 45,100 | 44,500 | 43,800 |
| Flexural strength at 70° C. (psi) | 18,600 | 30,400 | 26,200 | 35,400 |

Example 19

A resin mixture was prepared by mixing the following ingredients at about 25° C.
- 50 g of diethylene glycol dimethacrylate,
- 85 g of styrene,
- 26 g of Isocyanate II,
- 19 g of Polyol I, and
- 3.4 g of t-butyl perbenzoate.

The resin mixture was poured into 180 g of glass fiber in the pressure bag mold and molded into a plaque as described in Example 1. The plaque was then tested as described in Control A.

The results are shown in Table VIII.

Example 20

A resin mixture was prepared by mixing the following ingredients at about 25° C.:
- 33 g of diethylene glycol dimethacrylate,
- 57 g of styrene,
- 52 g of Isocyanate II,
- 38 g of Polyol I, and
- 2.3 g of t-butyl perbenzoate.

The resin mixture was poured into 180 g of glass fiber in the pressure bag mold and molded into a plaque as described in Example 1. The plaque was then tested as described in Control A.

The results are shown in Table VIII.

TABLE VIII

| Example | Control F | 19 | 20 | Control D |
|---|---|---|---|---|
| Wt. ratio of Polyester to Polyurethane | 100/0 | 75/25 | 50/50 | 0/100 |
| Wt. % of glass | 44.6 | 54.9 | 34.8 | 47.5 |
| Heat Distortion Temp. (°C.) | >260 | >260 | >260 | 227 |
| Notched Izod Impact (ft-lb/in$^2$) | 23.8 | 22.8 | 17.1 | 20.4 |
| Tensile strenth (psi) | 21,300 | 30,300 | 24,200 | 23,700 |
| Tensile modulus (psi) × 10$^6$ | 1.16 | 1.58 | 1.17 | 1.43 |
| Elongation at break (%) | 2.2 | 2.3 | 2.6 | 1.9 |
| Flexural modulus at −29° C. (psi) × 10$^6$ | 1.29 | 1.45 | 1.26 | 1.34 |
| Flexural modulus at 25° C. (psi) × 10$^6$ | 1.15 | 1.90 | 1.34 | 1.19 |
| Flexural modulus at 70° C. (psi) × 10$^6$ | 0.94 | 1.07 | 0.40 | 0.96 |
| Flexural strength at −29° C. (psi) | 32,100 | 46,800 | 37,100 | 44,900 |
| Flexural strength at 25° C. (psi) | 28,700 | 48,600 | 37,100 | 32,700 |
| Flexural strength at 70° C. (psi) | 18,600 | 27,600 | 13,100 | 17,700 |

The following Examples 21 to 26 show the use of additional combinations of dimethacrylates, polyols and polyisocyanates in preparing the composites of this invention.

Example 21

A resin mixture was prepared by mixing the following ingredients at about 25° C.:
- 47 g of ethoxylated bisphenol-A dimethacrylate,
- 43 g of styrene,
- 53 g of Isocyanate I,
- 37 g of Polyol II, and
- 2.3 g of t-butyl perbenzoate.

The resin mixture was poured into 180 g of glass fiber in the pressure bag mold and moled into a plaque as described in Example 1. The plaque was then tested as described in Control A.

The results are shown in Table IX.

Example 22

A resin mixture was prepared by mixing the following ingredients at about 25° C.:
- 47 g of ethoxylated bisphenol-A dimethacrylate,
- 43 g of styrene,
- 46 g of Isocyanate II,
- 44 g of Polyol II, and
- 2.3 g of t-butyl perbenzoate.

The resin mixture was poured into 180 g of glass fiber in the pressure bag mold and molded into a plaque as described in Example 1. The plaque was then tested as described in Control A.

The results are shown in Table IX.

Example 23

A resin mixture was prepared by mixing the following ingredients at about 25° C.:
- 40 g of tetraethylene glycol dimethacrylate,
- 50 g of styrene,
- 53 g of Isocyanate I,
- 37 g of Polyol II, and
- 2.3 g of t-butyl perbenzoate.

The resin mixture was poured into 180 g of glass fiber in the pressure bag mold and molded into a plaque as described in Example 1. The plaque was then tested as described in Control A.

The results are shown in Table IX.

Example 24

A resin mixture was prepared by mixing the following ingredients at about 25° C.:
- 40 g of tetraethylene glycol dimethacrylate,
- 50 g of styrene,
- 46 g of Isocyanate II,
- 44 g of Polyol II, and
- 2.3 g of t-butyl perbenzoate.

The resin mixture was poured into 180 g of glass fiber in the pressure bag mold and molded into a plaque as described in Example 1. The plaque was then tested as described in Control A.

The results are shown in Table IX.

Example 25

A resin mixture was prepared by mixing the following ingredients at about 25° C.:
- 33 g of diethylene glycol dimethacrylate,
- 57 g of styrene,
- 53 g of Isocyanate I,
- 37 g of Polyol II, and
- 2.3 g of t-butyl perbenzoate.

The resin mixture was poured into 180 g of glass fiber in the pressure bag mold and molded into a plaque as described in Example 1. The plaque was then tested as described in Control A.

The results are shown in Table IX.

Example 26

A resin mixture was prepared by mixing the following ingredients at about 25° C.:
- 33 g of diethylene glycol dimethacrylate,
- 57 g of styrene,
- 46 g of Isocyanate II,
- 44 g of Polyol II, and
- 2.3 g of t-butyl perbenzoate.

The resin mixture was poured into 180 g of glass fiber in the pressure bag mold and molded into a plaque as described in Example 1. The plaque was then tested as described in Control A.

The results are shown in Table IX.

TABLE IX

| Example | Wt. ratio of Polyester to Polyurethane | Wt. % of Glass | Heat Distortion Temp. (°C.) | Notched Izod Impact (ft-lb/in²) | Tensile Strength (psi) | Tensile Modulus × 10⁶ (psi) | Elongation at Break (%) | Flexural modulus at −29° C. (psi) × 10⁶ | Flexural modulus at 25° C. (psi) × 10⁶ | Flexural modulus at 70° C. (psi) × 10⁶ | Flexural Strength at −29° C. (psi) | Flexural Strength at 25° C. (psi) | Flexural Strength at 70° C. (psi) |
|---|---|---|---|---|---|---|---|---|---|---|---|---|---|
| Control A | 100/0 | 53.3 | >260 | 17.6 | 22,400 | 1.22 | 2.0 | 1.28 | 1.39 | 1.12 | 33,100 | 31,400 | 25,500 |
| 21 | 50/50 | 46.4 | >260 | 15.6 | 27,000 | 1.71 | 1.9 | 1.48 | 1.65 | 1.27 | 43,600 | 43,700 | 38,300 |
| 22 | 50/50 | 52.6 | >260 | 17.3 | 26,300 | 1.64 | 2.0 | 1.51 | 1.86 | 1.29 | 47,000 | 51,200 | 37,700 |
| Control E | 100/0 | 52.3 | >260 | 19.2 | 20,700 | 1.15 | 2.1 | 0.99 | 1.19 | 0.28 | 31,200 | 29,900 | 8,600 |
| 23 | 50/50 | 48.4 | 260 | 17.6 | 27,600 | 1.45 | 2.3 | 1.62 | 1.51 | 1.17 | 54,700 | 41,900 | 32,900 |
| 24 | 50/50 | 46.4 | >260 | 17.8 | 23,300 | 1.23 | 2.3 | 1.34 | 1.47 | 0.95 | 42,600 | 43,800 | 27,900 |
| Control F | 100/0 | 44.6 | >260 | 23.8 | 21,300 | 1.16 | 2.2 | 1.29 | 1.15 | 0.94 | 32,100 | 28,700 | 18,600 |
| 25 | 50/50 | 47.1 | >260 | 19.9 | 30,400 | 1.59 | 2.3 | 1.44 | 1.52 | 1.26 | 46,600 | 44,200 | 37,700 |
| 26 | 50/50 | 48.1 | >260 | 19.3 | 28,300 | 1.54 | 2.3 | 1.47 | 1.67 | 1.25 | 47,100 | 44,900 | 36,600 |

What is claimed is:

1. A curable molding composition consisting of a mixture of:

I. from about 25 to 50 weight percent of a thermosetting resin containing:
   (a) from about 25 to about 75 weight percent of a polyesfter resin produced by the coreaction of a poly(acrylate) and styrene in the presence of a catalyst for said coreaction, said poly(acrylate) being essentially free from functional groups reactive with the polyol or the polyisocyanate of (b); said poly(acrylate) being characterized by the following emprical formula:

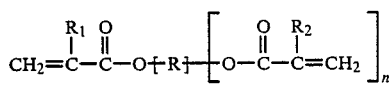

wherein R is the residue of an organic polyhydric alcohol which contained alcoholic hydroxyl groups bonded to different carbon atoms, $R_1$ and $R_2$ are independently hydrogen or methyl, and n is 1 to 3;
   (b) from about 75 to about 25 weight percent of a polyurethane produced by the reaction of (i) a saturated polyol having a functionality of from about 2 to about 8 and an equivalent weight of from about 30 to about 350 and (ii) a polyisocyanate having an isocyanate equivalent weight of less than about 300, said polyol and polyisocyante being free from unsaturated groups capable of copolymerizing with the poly(acrylate) or styrene of (a); and II. from about 75 to about 50 weight percent of one or more fibers having a melting point or a glass transition temperature above about 130° C.;
   wherein (b) constitutes less than 40 weight percent of (I) and (II).

2. A molding composition as defined in claim 1 wherein the poly(acrylate) is ethoxylated bisphenol-A dimethacrylate or diacrylate.

3. A molding composition as defined in claim 1 wherein the poly(acrylate) is tetraethylene glycol dimethacrylate or diacrylate.

4. A molding composition as defined in claim 1 wherein the poly(acrylate) is diethylene glycol dimethacrylate or diacrylate.

5. A molding composition as defined in claim 1 wherein the poly(acrylate) and styrene are combined in proportions of from about 30:70 to about 70:30.

6. A molding composition as defined in claim 1 wherein the polyol and polyisocyanate are combined such that the molar ratio of isocyanate to hydroxyl groups is in the range of from about 1.2:1 to 0.8:1.

7. A molding composition as defined in claim 1 wherein the catalyst for the coreaction of the poly(acrylate) and styrene is a peroxide or azo compound.

8. A molding composition as defined in claim 1 which contains a catalyst for formation of the polyurethane.

9. A molding composition as designed in claim 1 in which the thermosetting resin contains about 50 weight percent of each of the polyester and polyurethane.

10. A molding composition as defined in claim 1 wherein the fibers are fiberglass, carbon fibers, aromatic polyamide fibers, or mixtures thereof.

11. A molding composition as defined in claims 1 or 10 which contains no more than about 65 weight percent of fiber.

12. A molded article produced from the composition of claims 1, 2, 3, or 4.

* * * * *